United States Patent [19]

Kardach et al.

[11] Patent Number: 5,274,834
[45] Date of Patent: Dec. 28, 1993

[54] TRANSPARENT SYSTEM INTERRUPTS WITH INTEGRATED EXTENDED MEMORY ADDRESSING

[75] Inventors: James Kardach, San Jose; Cau Nguyen, Milpitas, both of Calif.

[73] Assignee: Intel Corporation, Santa Clara, Calif.

[21] Appl. No.: 753,605

[22] Filed: Aug. 30, 1991

[51] Int. Cl.⁵ ............................................. G06F 13/24
[52] U.S. Cl. .................................. 395/800; 395/725; 395/650; 395/425; 364/241.6; 364/941
[58] Field of Search ............... 395/375, 425, 650, 725, 395/800

[56] References Cited

U.S. PATENT DOCUMENTS

| | | | |
|---|---|---|---|
| 3,577,185 | 5/1971 | Belady | 395/425 |
| 3,594,732 | 7/1971 | Mendelson | 395/725 |
| 4,434,462 | 2/1984 | Guttag | 395/375 |
| 4,519,032 | 5/1985 | Mendell | 395/425 |
| 4,591,975 | 5/1986 | Wade | 395/725 |

Primary Examiner—David Y. Eng
Attorney, Agent, or Firm—Blakely, Sokoloff, Taylor & Zafman

[57] ABSTRACT

A dedicated memory area is provided on a microprocessor system for storing a customizable system interrupt service routine, and processor state data at the time of interruption. The dedicated memory area is normally not mapped as part of the main memory space, thereby keep it inaccessible to the operating system and applications. An unmaskable system supervisor interrupt having higher priority than all other maskable and unmaskable interrupts is added to the CPU interrupts. The extended memory addressing limits are overridden when the CPU is interrupted by this added interrupt. A RESUME instruction is added to the CPU instructions to provide recovery of the CPU to the state before it was interrupted. The extended memory addressing limits are restored when the CPU is restored by the RESUME instruction. As a result, a system integrator or OEM may provide transparent system level interrupts with integrated extended memory addressing that will operate reliably in any operating environment, and be able to address the entire physical address space and have access to all system resources in a stand alone manner during the interrupt.

18 Claims, 3 Drawing Sheets

TRANSPARENT SYSTEM INTERRUPTS WITH INTEGRATED EXTENDED MEMORY ADDRESSING

BACKGROUND OF THE INVENTION

Field of the Invention

The present invention relates to the field of microprocessor architecture. In particular, the present invention is a method and apparatus for providing transparent system interrupts with integrated extended memory addressing.

BACKGROUND

In the co-pending U.S. patent application, Ser. No. 07/594,278, filed Oct. 9, 1990, assigned to the assignee of the present application, Intel Corporation, entitled Transparent System Interrupt, a method and apparatus for providing transparent system interrupts was disclosed, which has particular application to microprocessor architecture. The method and apparatus disclosed in the co-pending U.S. patent application solves the problem inherent in prior art microprocessors, particularly those that have a protected mode as well as a real mode of operation, of the inability of a system integrator or original equipment manufacturer (OEM) to provide transparent system interrupts.

Transparent system interrupts are system-level interrupts that may not be relocated or overwritten by any operating system or application, thereby allowing a system integrator using the microprocessor to provide system-level interrupts that will operate reliably in any operating environment. Under the preferred embodiment disclosed in the co-pending U.S. patent application, a transparent system interrupt is invoked by the assertion of an electrical signal at an external pin of the central processing unit (CPU) chip of a microprocessor-based chip set.

Upon assertion of the electrical signal at the external pin of the CPU chip, the CPU maps a normally unmapped dedicated random access memory (RAM) area where the transparent system interrupt service routine is stored as a pre-determined area of the main memory space, saves the current CPU state into the dedicated RAM space, and begins execution of the transparent system interrupt service routine. The transparent system interrupt routine typically comprises instructions that are unique to a particular application of the transparent system interrupts to the system in which the CPU chip is installed. Recovery from the transparent system interrupt is accomplished upon the execution of a "Resume" instruction causing the CPU to be restored to exactly the same state that existed prior to the transparent system interrupt.

An important application of the transparent system interrupt is to power management functions, whereby the processor and/or other system devices may be effectively shut down during periods of non-use and then restarted without the need to go through a power-up routine. This function is particularly useful in connection with battery-operated computers where power conservation is a primary concern. Thus, for example, if a computer operator is interrupted while working with an application program, the system may be powered down to conserve battery life. When the operator returns to use the system, it is restored to the same point in the application program as if the system had been running throughout the intervening period of time. The operator need not take any action to save application program results prior to the interruption, nor reload the application program when returning to use the computer.

Experience have shown, particularly for power management, that it is desirable to be able to address the entire physical address space and have access to all system resources when servicing a transparent system interrupt. Due to address accessing limitations, traditional prior art microprocessors typically require some form of extended memory addressing to address the entire physical address space in real mode of execution. For the method and apparatus disclosed in the co-pending U.S. patent application, a prior art extended memory (EMS) mapper is used for accessing high memory. Typically, the prior art EMS mapper comprises a EMS control register and multiple sets of EMS page registers. Each set of EMS page registers comprises multiple page registers. The EMS mapper determines the EMS address using the n lowest address bits of the system address and a page register in one of the EMS page register sets. The EMS control register controls which EMS page register set is used. The next m higher address bits of the system address determines which page register of a EMS page register set is used. For further description of the prior art EMS mapper, see, for example, assignee's publication entitled *i386 TM SL Microprocessor SuperSet Programmer's Reference Manual*, published by Intel Corporation as publication number 240815, pages 4-32 to 4-39.

Using the prior art EMS mapper to access high memory has at least three disadvantages:

a) it does not allow the transparent system interrupts to be serviced in a stand alone manner;

b) it requires more hardware; and c) it limits the portability of the method and apparatus for providing transparent system interrupts disclosed in the co-pending U.S. patent application to other microprocessor-based chip sets.

SUMMARY OF THE INVENTION

It is therefore an object of the present invention to provide an improved transparent system interrupt with integrated extended memory addressing.

Under the present invention, a transparent system interrupt is invoked by the assertion of an electrical signal at an external pin of the central processing unit (CPU) chip of a microprocessor-based chip set. Upon assertion of the electrical signal at the external pin of the CPU chip, the CPU maps a normally unmapped dedicated random access memory (RAM) area where the transparent system interrupt service routine is stored as a pre-determined area of the main memory space, saves the current CPU state into the dedicated RAM space, extends the memory addressing limits, and begins execution of the transparent system interrupt service routine.

The memory addressing limits are extended by modifying the limit parameter of each descriptor of the microprocessor system to equal the highest physical address of the microprocessor system. Additionally, execution of the transparent system interrupt service routine is started with the pre-fetch limit also set to equal the highest physical address of the microprocessor system. As a result, the transparent system interrupt routine may address the entire physical memory space, and have access to all system resources.

The transparent system interrupt service routine typically comprises instructions that are unique to a particular application of the transparent system interrupts to the system in which the CPU chip is installed. Recovery from the transparent system interrupt is accomplished upon execution of a "Resume" instruction causing the CPU to be restored to exactly the same state that existed prior to the transparent system interrupt.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION

System Overview

Figure 1:
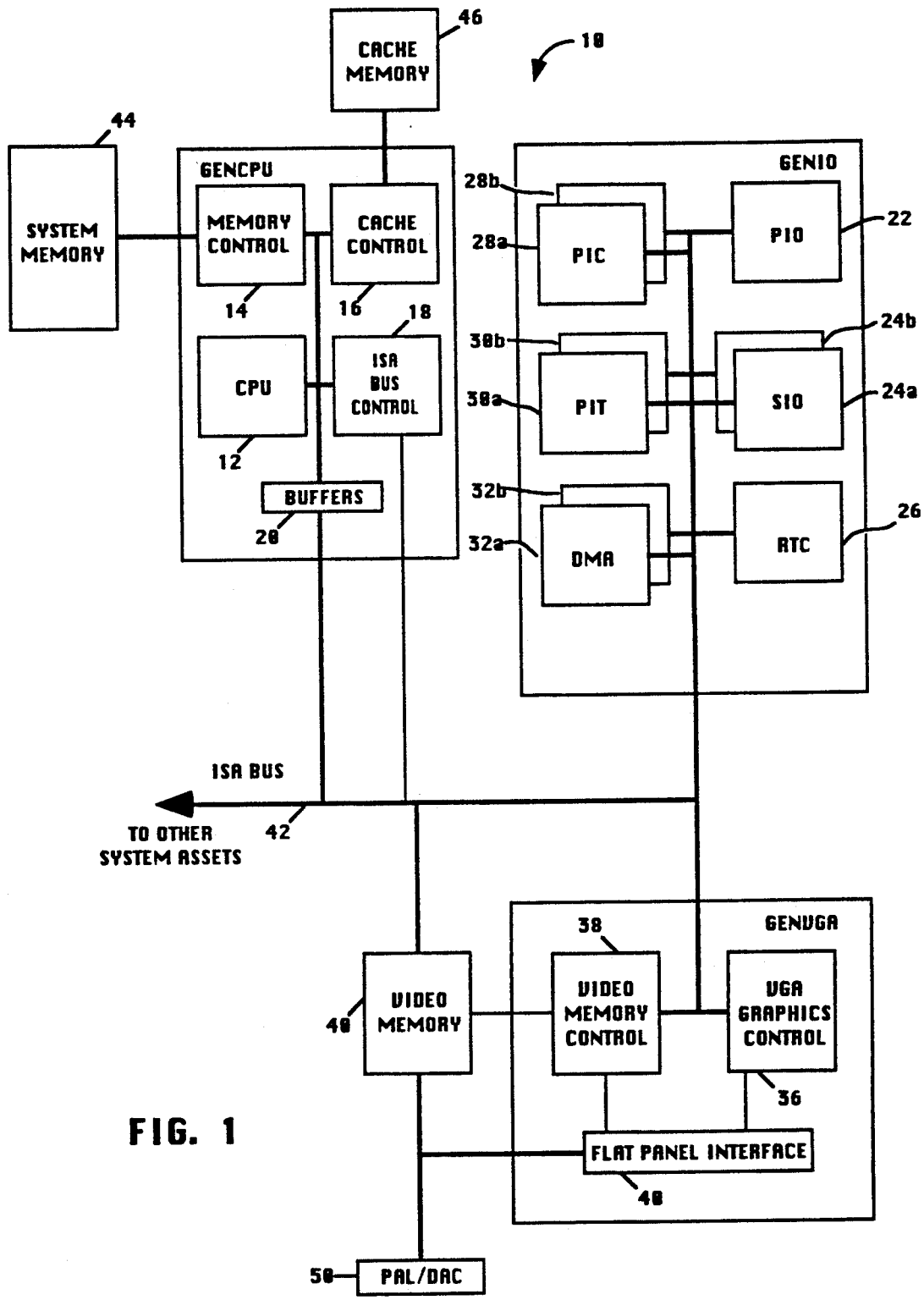
FIG. 1 is a functional block diagram of an exemplary microprocessor system embodying the present invention.

Referring now to FIG. 1, a block diagram illustrating an exemplary microprocessor system embodying the present invention is shown. The exemplary microprocessor system is briefly described below; however, it is to be understood that the present invention is not limited to this particular microprocessor design, and may be incorporated in virtually any processor design.

The exemplary microprocessor system 10 comprises three main components, designated as GENCPU, GENIO and GENVGA. GENCPU is an expanded central processing unit; GENIO is a single chip input/output unit; and GENVGA is a single chip graphics interface. The three components communicate with each other and with other system components (such as expansion slots, keyboard controller, disk controllers) via ISA bus 42.

GENCPU includes a CPU 12, a memory controller 14, a cache controller 16, ISA bus control logic 18 and line buffers 20. CPU 12 is essentially a "i386 TM SX" CPU manufactured by Intel Corporation, the corporate assignee of this invention. Throughout this description, certain terminology relating to the "i386 TM SX" CPU, such as register names, signal nomenclature, is employed to described the present invention. Such terminology is understood by practitioners in the field of microprocessor design and will therefore not be explained at length; only the terminology with direct relevance will be briefly described herein.

In particular, CPU 12 comprises a plurality of base architecture registers (not shown). The contents of these base architecture registers are task specific and are automatically loaded with a new context upon a task switch operation. These base architecture registers comprise a plurality of programmer visible general purpose registers, a plurality of programmer visible memory segment registers and a plurality of corresponding programmer invisible memory segment descriptor registers. The contents of the programmer visible memory segment registers identify the currently addressable memory segments. The contents of the memory segment descriptor registers describes the corresponding currently addressable memory segments identified. Each memory segment descriptor register comprises a memory segment limit and a memory segment base address for the corresponding currently addressable memory segment identified.

CPU 12 also comprises a plurality of system level registers (not shown). The contents of the system level registers control operation of the segmentation and paging mechanism and other on-chip assets. The system level registers comprises a plurality of system segment registers and a plurality of corresponding system segment descriptor registers. The contents of the system segment registers identify various system tables. The contents of the corresponding system segment descriptor registers describe the various system tables identified. Each system segment descriptor register comprises a system segment limit and a system segment base address for the corresponding system table identified.

Additionally, CPU 12 comprises logics (not shown) for executing a plurality of instructions. The instructions operate on either zero, one, two or three operands. An operand either resides in the instruction, in a register or in a memory location. CPU 12 has two modes of operations, a real mode and a protected mode. The primary differences between the real mode and the protected mode is how a logical address is translated into a linear address, the size of the address space, and paging capability. Memory addressing will be discussed in further detail later.

CPU 12 also comprises logics (not shown) for executing a plurality of hardware interrupts. Hardware interrupts occur as the result of an external event and are classified into two types: maskable and non-maskable. Interrupts are serviced after execution of the current instruction. After the interrupt service routine is finished with servicing the interrupt, execution proceeds with the instruction immediately after the interrupted instruction. Maskable interrupts are typically used to respond to asynchronous external hardware events. Unmaskable interrupts are typically used to service very high priority events.

For further description of CPU 12, see *i386 TM SX Microprocessor*, published by Intel Corporation as publication number 240187, and related publications.

GENIO includes parallel ports (PIO) 22, dual serial ports (SIO) 24a, 24b, real time clock unit (RTC) 26, dual programmable interrupt controllers (PIC) 28a, 28b, dual programmable timers (PIT) 30a, 30b, and dual direct memory access controllers (DMA) 32a, 32b. GENVGA includes VGA graphics controller 36, video memory controller 38 and interface 40 for a flat panel display unit.

Additionally, external to the three main components are system memory 44, cache memory 46, video memory 48, and an interface (PAL/DAC) 50 for a conventional VGA monitor. The system memory 44, the cache memory 46 and video memory 48 are accessed by the memory controller 14, cache memory controller 16 and video memory controller 38 respectively. The video memory 48 may also be accessed through the ISA bus 42, and the two interfaces 40, 50.

For further description relating to the "i386 TM SX Microprocessor, see *i386 TM SX Microprocessor Hardware Reference Manual*, by Intel Corporation as publication number 240332, and related publications.

Memory Address Translation

Figure 2:
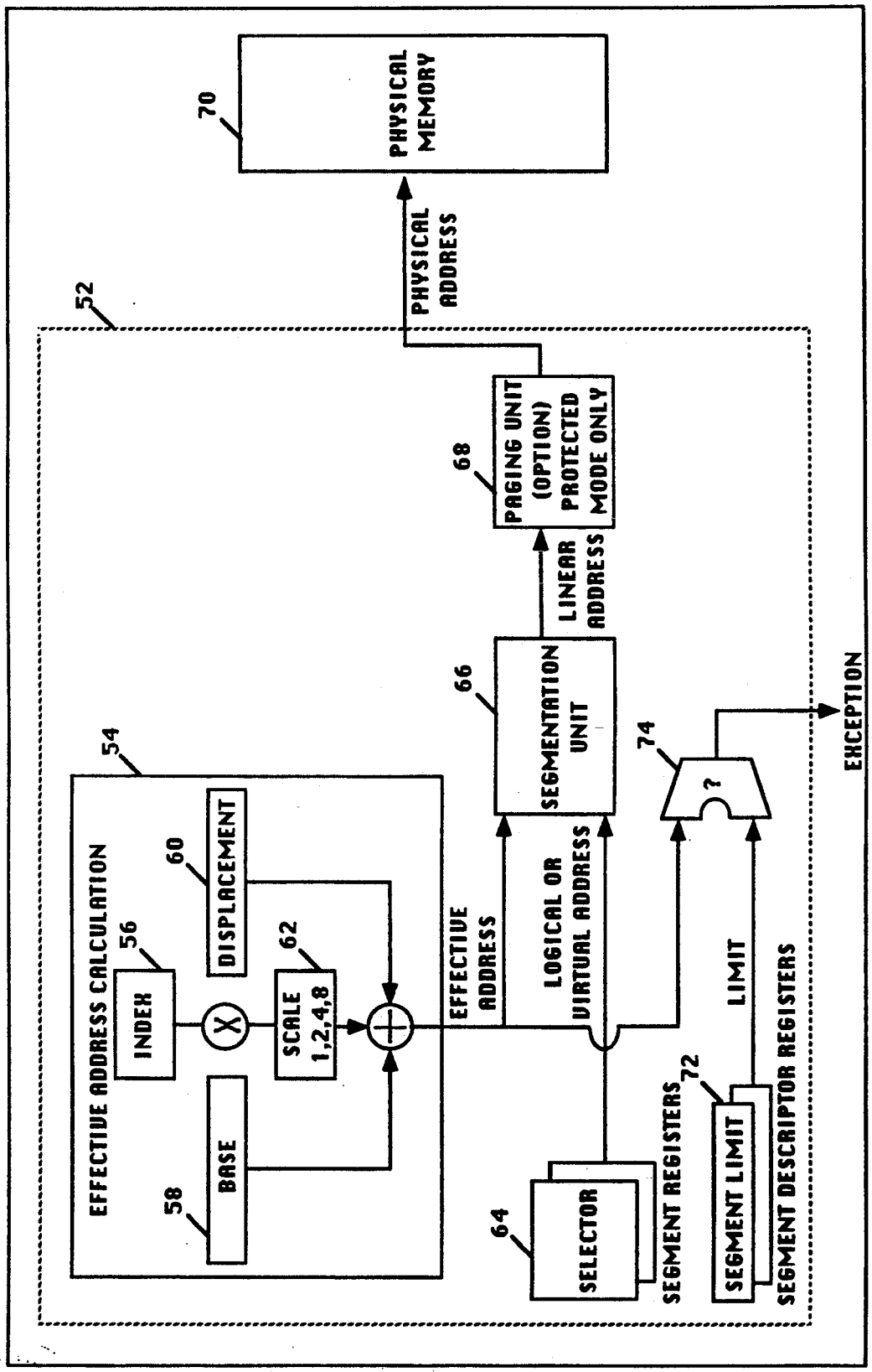
FIG. 2, a block diagram illustrating memory address translation of the effective addressing modes of the exemplary microprocessor system of FIG. 1.

Referring now to FIG. 2, a block diagram illustrating memory address translation for the effective addressing modes of the exemplary microprocessor system of FIG. 1 is shown. The exemplary microprocessor comprises a plurality of effective addressing modes to facilitate efficient execution of programs implemented in different programming languages. An effective address is calculated from a base value 58, a displacement value 60, or the sum of the base and displacement values 58, 60, with or without scaling in each of the three cases. The base, displacement, index and scale values are contained in the general purpose and instruction registers.

The effective address and a segment selector contained in one the segment registers 64 are provided to the segmentation unit 66 to derive the corresponding linear address. In real mode, the segment selector is shifted and and added to the effective address to form the linear address. Concurrently, the effective address and a segment limit contained in the corresponding segment descriptor register 72 are provided to a comparator 74 for address limit check. An exception is generated if the effective address exceeds the segment limit. The physical address is the same as the linear address. The maximum segment size is 64 Kbytes, and the maximum addressable linear (physical) address space is 1 Mbytes. In protected mode, a logical base address is added to the effective address to derive the linear address. The logical base address is contained in the segment descriptor register corresponding to segment register 64 containing the segment selector. The linear address is either truncated or provided to the paging unit 68 to derive the corresponding physical address. The maximum physical address space is 16 Mbytes. With paging, the maximum linear address space is 4 Gbytes, and the maximum logical address space is 64 Tbytes.

For further description relating to effective address translation, see *i386 TM SX Microprocessor*, published by Intel Corporation as publication number 240187, and related publications.

Transparent System Interrupt with Integrated Extended Memory Addressing

The present invention is implemented by means of three enhancements to a conventional prior art microprocessor architecture, for example, the assignee's "i386 TM " architecture, as follows:

1. A new interrupt called the System Supervisor interrupt (SSI) for superseding the entire microprocessor system's protection mechanism, including the memory addressing limits of the microprocessor system. The SSI interrupt is non-maskable and has a higher priority than all other interrupts, including other non-maskable interrupt. The SSI interrupt is serviced by a SSI interrupt service routine.

2. A special system transparent memory area referred to as System Management RAM or SMRAM for storing the SSI interrupt service routine and the state of the CPU at the time it was interrupted.

3. A new instruction, called RESUME, for returning the microprocessor system to the state just before it was interrupted by an SSI interrupt.

Figure 3:
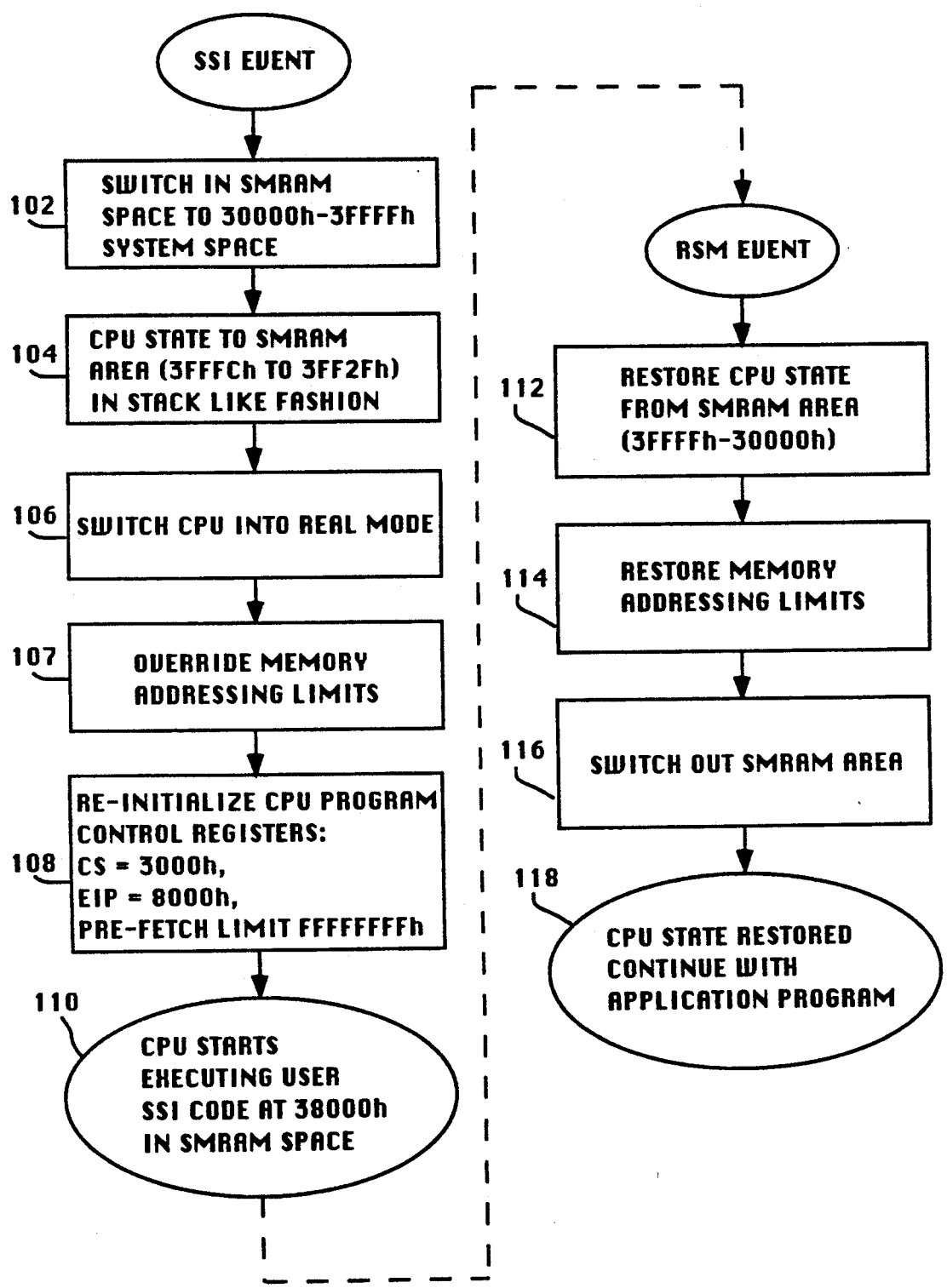
FIG. 3 is a functional flow diagram of the microcode for the transparent system interrupt with integrated extended memory addressing of the present invention.

Referring now to FIG. 3, a flow chart illustrating the microcode of the SSI interrupt of the present invention is shown. A SSI interrupt is invoked by the assertion of an electrical signal at an external pin of the CPU chip. Upon detection of the electrical signal at the external pin of the CPU chip (SSI event), the CPU maps the SMRAM as a pre-determined area of main memory space, block 102. The SMRAM is normally not mapped as part of the main memory space, thereby making it inaccessible to the operating system and the applications. Additionally, the CPU saves the CPU state into the SMRAM space, block 104, switches the CPU into real mode, block 106, extends the memory addressing limits, block 107, re-initializes the CPU's program control registers, block 108, and starts execution of the SSI interrupt service routine, block 110. The SSI interrupt service routine typically comprises instructions that are unique to a particular application of the SSI interrupt to the system in which the CPU chip is installed.

Recovery from the SSI interrupt is accomplished upon recognition of an external event that invokes the "Resume" instruction (RSM event). Upon detection of the external event, the CPU restores the CPU state stored in the SMRAM area block 112, restores the memory addressing limits, block 113, switches out the SMRAM area and unmaps it as part of the main memory space, block 114, and continues execution of the interrupted operating system or application program, block 116.

These enhancements, except extending and restoring the memory addressing limits, including a specific application of the SSI interrupt, the power management interrupt (PMI), are described in detail in the co-pending U.S. patent application, which is hereby fully incorporated by reference.

The memory addressing limits are extended, block 107, by modifying all the segment limits stored in the segment descriptor registers to the highest physical address of the microprocessor system, FFFFFFFFh for the exemplary microprocessor of FIG. 1. The memory addressing limits are restored, block 113, by modifying the highest physical address stored in the segment descriptor registers back to their respective segment limits. Additionally, the CPU is reinitialized, block 108, with a prefetch limit equaling the highest physical address of the microprocessor system. Thus, the SSI interrupt service routine may address the entire physical memory and have access to all system resources of the microprocessor system.

While the method of the present invention has been described in terms of its presently preferred form, those skilled in the art will recognize that the method of the present invention is not limited to the presently preferred form described. The method of the present invention may be practiced with modification and alteration within the spirit and scope of the appended claims. The specifications and drawings are, accordingly, to be regarded in an illustrative rather than a restrictive sense.

What is claimed is:

1. An improved microprocessor system comprising a central processing unit (CPU) coupled to at least one memory unit for executing an operating system and at least one application program having a plurality of said CPU's instructions, said CPU further having at least two modes of program execution, a real mode and a protected mode, at least one mode of memory address translation limited by at least one addressing limit, checking means for enforcing said at least one addressing limit, at least one interrupt for interrupting program execution, and means for masking and prioritizing said at least one interrupt by said operating system and said at least one application program, wherein the improvement to said microprocessor system comprises:

(a) said memory units having a dedicated memory area for storing an interrupt processing program and processor state data of said CPU;

(b) mapping means for mapping and unmapping said dedicated memory area as part of main memory space of said microprocessor system, said dedicated memory area being normally not mapped as part of said main memory space thereby keeping said dedicated memory area inaccessible to said operating system and at least one application program;

(c) System Supervisor Interrupt (SSI) means coupled with said CPU, said memory units, and said mapping means for interrupting execution of said operating system and said at least one application program, switching in and mapping said dedicated memory area to a pre-determined segment of said main memory space, storing said processor state data of said CPU into said dedicated memory area, switching said CPU into said real mode of execution, overriding said at least one addressing limit of said at least one memory address translation mode, and starting execution of said interrupt processing program, said SSI being unmaskable by said operating system and said at least one application program, and having a higher priority than other interrupts;

(d) said interrupt processing program for servicing said SSI:

(e) Resume means coupled with said CPU, said memory units and said mapping means for restoring said saved processor state data from said dedicated memory area to said CPU, restoring said at least one addressing limit of said at least one memory address translation mode, switching out and unmapping said dedicated memory area to said main memory space, and resuming execution of said operating system and said at least one application program;

thereby allowing said CPU to be interrupted and integrated extended memory addressing to be provided to said interrupt service program in a manner transparent to said operating system and said at least one application program.

2. The improved microprocessor system as set forth in claim 1, wherein said memory units comprises on-board random access memory (RAM), and said dedicated memory area is part of said on-board RAM.

3. The improved microprocessor system as set forth in claim 1, wherein said memory units comprises off-board RAM coupled to an on-board RAM controller, and said dedicated memory area is part of said off-board RAM.

4. The improved microprocessor system as set forth in claim 1, wherein said CPU comprises triggering means for triggering said at least one interrupt and said SSI, said SSI being triggered upon receipt of an electrical signal, said triggering means comprising an interface for receiving said electrical signal.

5. The improved microprocessor system as set forth in claim 4, wherein said interface is an external circuit pin.

6. The improved microprocessor system as set forth in claim 4, wherein said microprocessor system further comprises event detection means coupled to at least one system asset of said microprocessor system and said triggering means for detecting a pre-determined event associated with said system asset and generating for said interface said electrical signal upon said detection.

7. The improved microprocessor system as set forth in claim 1, wherein, physical memory locations of said memory units being mapped to said main memory space are addressed by ordered physical memory addresses, and said physical memory locations are partitioned into a plurality of memory segments, said ordered physical memory addresses under said at least one mode of memory address translation are derived from a plurality of effective memory addresses and a plurality of memory segment selectors, each of said effective memory addresses being derived from a selected one of a base value, a displacement value, and the sum of said base and displacement values, each of said memory segment selectors being used to select one of said memory segments, said CPU comprises a plurality of memory segment descriptor registers couple to said checking means for storing a plurality of memory segment addressing limits for said memory segments, said memory segment addressing limits being used by said checking means to limit memory addressing, and said SSI means being also coupled to said memory segment descriptor registers overrides said at least one addressing limit of said at least one mode of memory address translation by modifying said stored memory segment addressing limits to the highest physical memory address of said memory units.

8. The improved microprocessor system as set forth in claim 7, wherein, said CPU further comprises a program control register for storing a pre-fetch memory addressing limit; and said SSI means being coupled to said program control register initializes said pre-fetch memory addressing limit to said highest physical memory address before starting execution of said interrupt processing program.

9. The improved microprocessor system as set forth in claim 7, wherein said SSI means restores said memory segment addressing limits by modifying said highest physical address stored in said segment descriptor registers to the previously stored memory segment addressing limits.

10. In a microprocessor system comprising a central processing unit (CPU) coupled to at least one memory unit for executing an operating system and at least one application program having a plurality of said CPU's instructions, said CPU further having at least two modes of program execution, a real mode and a protected mode, at least one mode of memory address translation limited by at least one addressing limit, checking means for enforcing said at least one addressing limit, at least one interrupt interrupting program execution, and means for masking and prioritizing said at least one interrupt by said operating system and said at least one application program, a method for interrupting said CPU and providing integrated extended memory addressing to an interrupt service program in a manner transparent to said operating system and at least one application program, said method comprising the steps of:

(a) storing said interrupt processing program in a dedicated memory area on said memory units, said dedicated memory area being normally not mapped as part of main memory space of said microprocessor system, thereby keeping said dedicated memory area inaccessible to said operating system and application programs;

(b) interrupting execution of said operating system and said at least one application program upon receipt of a pre-determined input, said interruption being unmaskable by said operating system and said at least one application program, and having a higher priority than other interruptions;

(c) switching in and mapping said dedicated memory area to a pre-determined segment of said main memory space;

(d) storing processor state data of said CPU into said dedicated memory area;

(e) switching said CPU into said real mode of execution;

(f) overriding said at least one addressing limit of said at least one memory address translation mode;

(g) starting execution of said interrupt processing program;

(h) restoring said saved processor state data from said dedicated memory area to said CPU, said restoration being controlled by said interrupt service program;

(i) restoring said overridden at least one addressing limit of said at least one memory address translation mode;

(j) switching out and unmapping said dedicated memory area from said main memory space; and (k) resuming execution of said operating system and said at least one application program.

11. The method as set forth in claim 10, wherein said memory units comprises on-board random access memory (RAM), and said dedicated memory area is part of said on-board RAM.

12. The method as set forth in claim 10, wherein said memory units comprises off-board RAM coupled to an on-board RAM controller, and said dedicated memory area is part of said off-board RAM.

13. The improved microprocessor system as set forth in claim 10, wherein said steps (b) through (g) are performed in response to a SSI triggered by triggering means of said CPU upon receipt of an electrical signal, said triggering means comprising an interface for receiving said electrical signal.

14. The method as set forth in claim 13, wherein said interface is an external circuit pin.

15. The method as set forth in claim 13, wherein said electrical signal being generated and provided to said interface by event detection means coupled to at least one system asset of said microprocessor system and said triggering means upon detection of a pre-determined event associated with said system asset.

16. The method as set forth in claim 10, wherein, physical memory locations of said memory units being mapped to said main memory space are addressed by ordered physical memory addresses, and said physical memory locations are partitioned into a plurality of memory segments;

said ordered physical memory addresses under said at least one mode of memory address translation are derived from a plurality of effective memory addresses and a plurality of memory segment selectors, each of said effect memory addresses being derived from a selected one of a base value, a displacement value, and the sum of said base and displacement values, each of said memory segment selectors being used to select one of said memory segments;

said at least one address limit is overridden in said step (f) by modifying a plurality of memory segment addressing limits to the highest physical memory address of said memory units;

said memory segment addressing limits are stored in a plurality of memory segment descriptor registers of said CPU, said memory segment addressing limits being used by said checking means to limit memory addressing.

17. The method as set forth in claim 16, wherein, said step (g) of starting execution of said interrupt processing program comprises an initial step of initializing a pre-fetch memory addressing limit to said highest physical memory address;

said pre-fetch memory addressing limit is stored in a program control register of said CPU.

18. The method as set forth in claim 16, wherein said at least one addressing limit is restored in said step (i) by modifying said highest physical address stored in said segment descriptor registers to the previously stored memory segment addressing limits.

* * * * *

UNITED STATES PATENT AND TRADEMARK OFFICE
CERTIFICATE OF CORRECTION

PATENT NO. : 5,274,834
DATED : December 28, 1993
INVENTOR(S) : James Kardach, Cau Nguyen It is certified that error appears in the above-indentified patent and that said Letters Patent is hereby corrected as shown below:

Column 7, line 3, please delete "said memory units", and insert thereto -- said memory unit --.

Column 7, line 15, please delete "said memory units", and insert thereto -- said memory unit --.

Column 7, line 18, after "gram" but before the first comma, please insert -- through generation of a SSI --.

Column 7, line 18, please delete "switching and mapping", and insert thereto -- causing --.

Column 7, line 19, after "memory area", please insert thereto -- to be switched in and mapped --.

Column 7, line 33, please delete "said memory units", and insert thereto -- said memory unit --.

UNITED STATES PATENT AND TRADEMARK OFFICE
CERTIFICATE OF CORRECTION

PATENT NO. : 5,274,834
DATED : December 28, 1993
INVENTOR(S) : James Kardach, Cau Nguyen It is certified that error appears in the above-indentified patent and that said Letters Patent is hereby corrected as shown below:

Column 7, lines 37 - 38, please delete "switching and mapping", and insert thereto -- causing --.

Column 7, line 38, after "memory area", please insert thereto -- to be switched in and mapped --.

Column 9, line 27, please delete "service", and insert thereto -- processing --.

Signed and Sealed this

Sixth Day of September, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,274,834

DATED : December 28, 1993

INVENTOR(S) : Kardach et al.

It is certified that error appears in the above-indentified patent and that said Letters Patent is hereby corrected as shown below:

On title page, Item [56], Insert --5,175,853  12/1992 Kardach et al. ..........395/650--.

Signed and Sealed this

Thirty-first Day of October 1995

Attest:

BRUCE LEHMAN

*Attesting Officer*      *Commissioner of Patents and Trademarks*